No. 868,524. PATENTED OCT. 15, 1907.
J. S. BAYER.
CULVERT.
APPLICATION FILED JUNE 20, 1907.
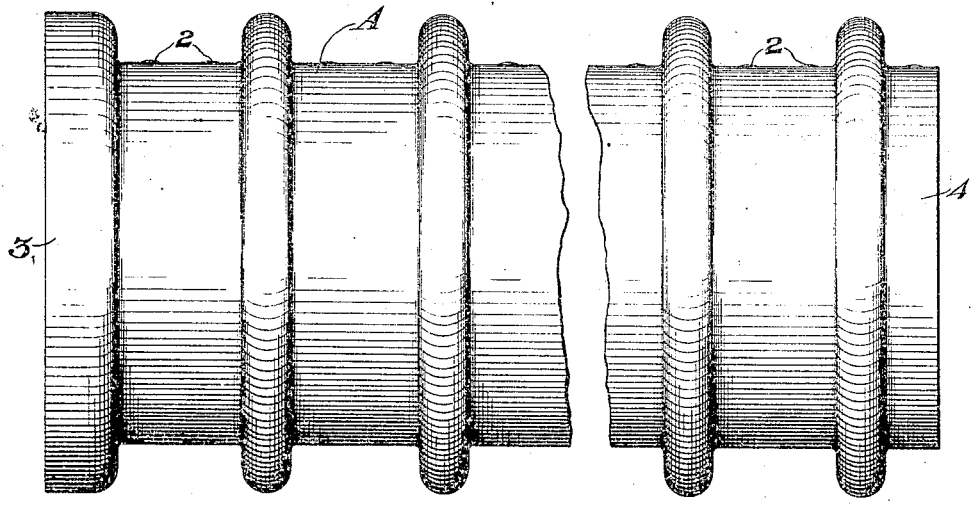
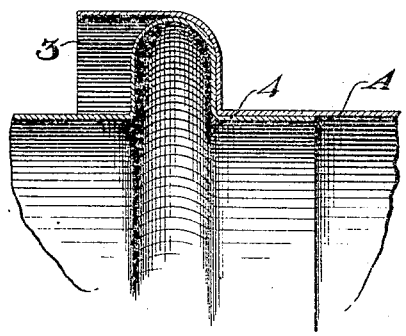 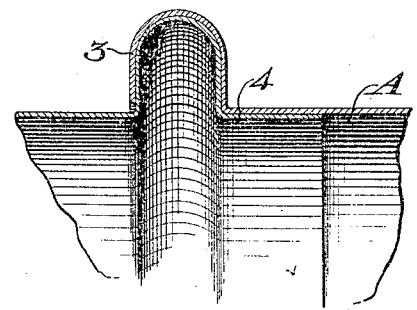
Witnesses
Inventor
John S. Bayer
By Addison G. DuBois
his Attorney

UNITED STATES PATENT OFFICE.

JOHN S. BAYER, OF WARREN, PENNSYLVANIA.

CULVERT.

No. 868,524.  Specification of Letters Patent.  Patented Oct. 15, 1907.

Application filed June 20, 1907. Serial No. 379,985.

*To all whom it may concern:*

Be it known that I, JOHN S. BAYER, a citizen of the United States, residing at Warren, in the county of Warren and State of Pennsylvania, have invented certain new and useful Improvements in Culverts, of which the following is a specification.

My invention relates to an improvement in culverts, and particularly to the class of metal culverts used for drainage for roads, railroads, and any place where the iron, wooden or stone culverts are used.

The object of my invention is to provide a culvert which will overcome the weakness in the joints or couplings now used.

My invention relates to certain other novel features of construction which will be hereinafter described and pointed out in the claims.

In the accompanying drawing:—Figure 1 is a view in side elevation of one of the sections. Fig. 2 is a sectional view showing the jointing or coupling of two sections. Fig. 3 is a sectional view showing the two sections coupled together.

A, represents one of the sections of the culvert, which is preferably made corrugated and of galvanized or other suitable iron. The section is made in any shape desired, but I have shown it made round, and riveted together horizontally as at 2.

One end of the section has a raised collar or bell 3, and the end 4 of the section is received within the raised collar which snugly fits the bore of the section, and the corrugation or ring at the end of the section conforms to the contour of the raised collar, which collar overlaps the corrugation and is adapted to be bent down around the corrugation whereby a tight joint or coupling is formed. This coupling makes a stronger joint, and the advantage over the couplings now in use, is that they are weak, as the ends of a section being the weaker part, but by having one end made in the shape of a bell and having the end of the section to be joined inserted within the bore of the section and the corrugation at the end of the pipe to conform to the bell, and having the bell or collar bent down over the corrugation, which can be done with a hammer, or with any suitable means, and by making the couplings in this manner and the fact that it is reinforced by the rings or corrugations at the joints makes it strong, and will not break or become weakened. In some cases it may be desirable to fill in the space between the corrugation and the rim of the bell.

It is evident that many slight changes might be made in the form and arrangement of the several parts described without departing from the spirit and scope of my invention, and hence I do not wish to limit myself to the exact construction herein set forth, but:—

Having fully described my invention, what I claim as new and desire to secure by Letters Patent, is:—

In a culvert, the combination of a plurality of corrugated sections, said sections having an open bell at one end adapted to receive the end of the adjoining section, the ring or corrugation on the section received within the bell, and the rim of the bell bent down around the ring or corrugation.

In testimony whereof I have signed my name to this specification in the presence of two subscribing witnesses.

JOHN S. BAYER.

Witnesses:
 MAY L. PILLSBURY,
 CURTIS M. SHAWKEY.